INVENTOR
Arley Gene Carroll

INVENTOR
Arley Gene Carroll

United States Patent Office 3,433,447
Patented Mar. 18, 1969

3,433,447
STABILIZING ASSEMBLY FOR HOIST
Arley Gene Carroll, 5616 Long, Shawnee, Kans. 66216
Filed Feb. 16, 1967, Ser. No. 616,676
U.S. Cl. 248—352   8 Claims
Int. Cl. F16m 13/00

ABSTRACT OF THE DISCLOSURE

A dolly for stabilizing a hoist for lifting parts from a vehicle engine compartment and having a mount for supporting the hoist alongside the vehicle. A support is secured to the mount for extending beneath the vehicle and includes a pair of jacks adapted to engage the undercarriage. A winch assembly is connected to the mount for securing the latter to the bumper of the vehicle to the end that the jack and winch couplings act to prevent tipping of the hoist during use.

---

This invention relates to a dolly for mounting and stabilizing a hoist for lifting engine parts from a vehicle and has as its primary object the provision of a dolly adapted to be releasably coupled beneath the vehicle in a novel manner for firmly supporting the hoist during use, whereby the hoist will not tip or swing to endanger the operator or cause damage to the removed parts and the vehicle.

It is an important object of the present invention to provide a dolly as above described which is readily coupled into supporting position beneath virtually any type and size of vehicle, and additionally, may be removed from its supporting position without the necessity of moving the vehicle.

Figure 1:
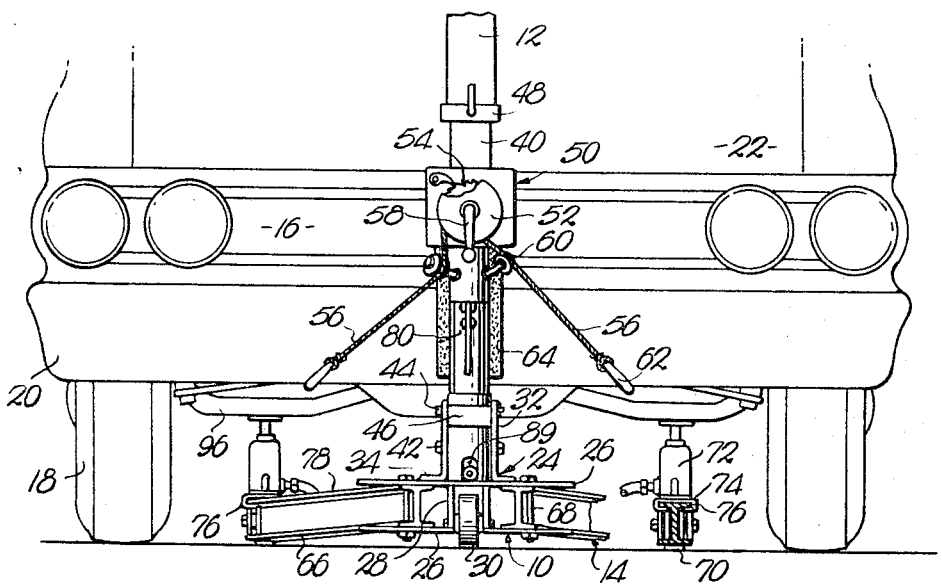
FIGURE 1 is a fragmentary, front elevational view of the present invention showing the same in use with the vehicle and hoist, parts being broken away and in section to reveal details of construction.
Figure 2:
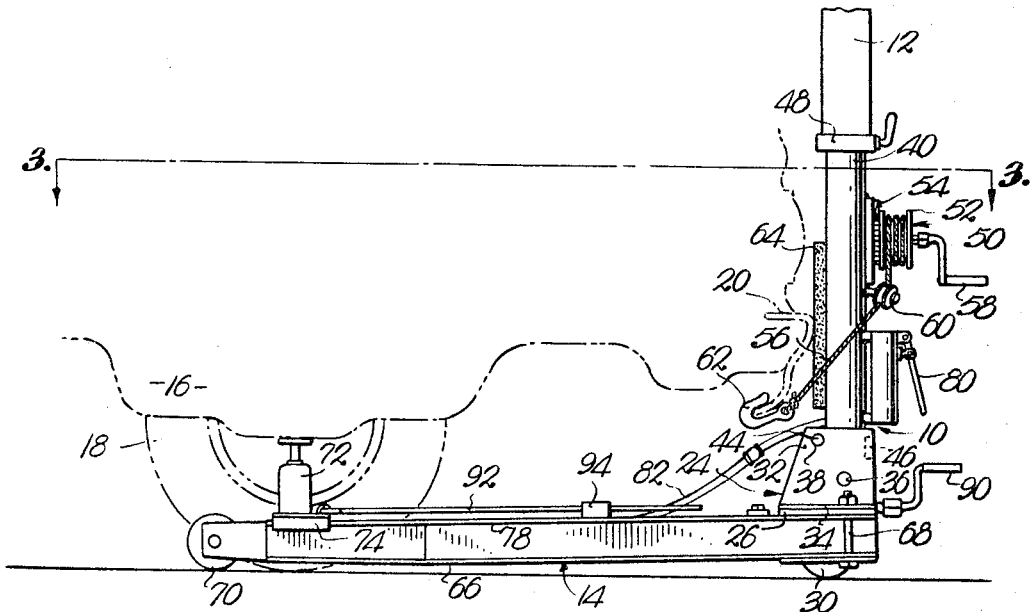
FIG. 2 is a fragmentary, side elevational view thereof.
Figure 3:
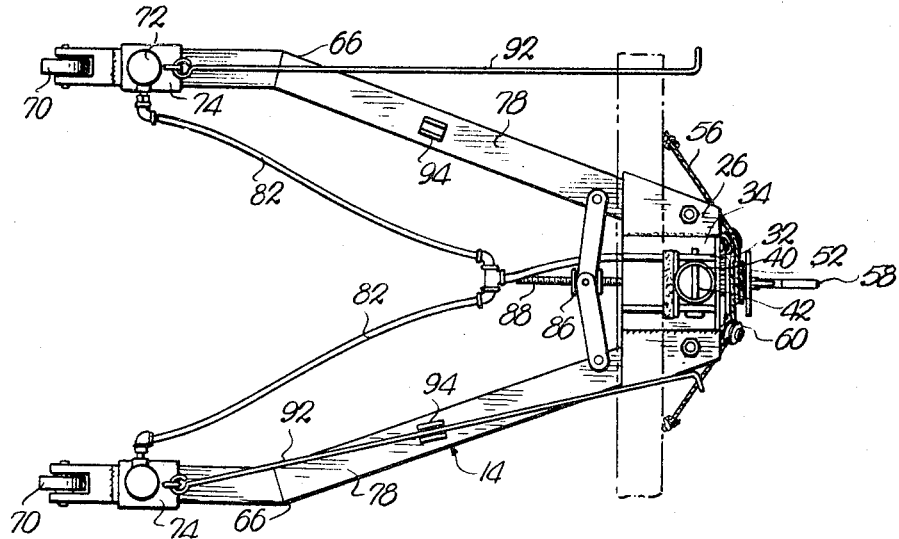
FIG. 3 is a cross sectional view taken along line 3—3 of FIG. 2.

The present invention takes the form of a dolly which broadly comprises a mount 10 for a hoist 12, the mount having a support 14 extending laterally therefrom and adapted to be disposed beneath a vehicle 16 supported by tires 18 and having a bumper 20. Hoist 12 may be of any conventional type and includes a portion overlying the engine compartment 22 of vehicle 16 for removing parts therefrom, such as cylinder heads or the like.

Mount 10 includes a base 24 having a pair of vertically spaced plates 26 interconnected by spaced webs 28 which support a roller 30 therebetween. A pair of side panels 32 are secured by the flanges 34 thereof to upper plate 26 and are provided with respective aligned apertures 36 and 38. A standard in the form of a tube 40 is pivotally mounted between panels 32 by a pintle 42 extending through apertures 36, the tube normally being maintained in an upright position by a pin 44 extending through apertures 38 and a crosspiece 46 interconnecting panels 32 in opposed relationship to pin 44. In the design chosen for illustration, tube 40 telescopically receives hoist 12 which is vertically adjustable thereon and held in position by locking means 48. Raising and lowering of hoist 12 may be effected by any desired means and could conveniently comprise a hydraulic powered, reciprocable ram within tube 40 and coupled with hoist 12 for vertical shifting of the latter.

A winch mechanism 50 is secured to tube 40 and includes a drum 52 having a ratchet and pawl means 54 for holding the same in a locked position. A pair of cables 56 are secured to drum 52 and oppositely wound thereon whereby the turning of the crank 58 on drum 52 will simultaneously wind cables 56 on the drum. Each cable 56 is trained over a respective grooved guide roller 60 mounted on tube 40 and has a hook 62 secured to the outermost end thereof. A cushion or pad 64 is provided on tube 40 in opposed relationship to winch mechanism 50.

Support 14 includes a pair of arms 66 each having a transversely I-shaped configuration and pivotally mounted at one end to a corresponding side of base 24 between plates 26 by a pivot bolt 68. Each arm 66 is provided with a roller 70 at the free end thereof for cooperation with roller 30 to render the dolly mobile.

Structure in the form of a jack unit 72 is provided for each arm 66 and is mounted on a slide 74. Slide 74 is provided with opposed ways 76 for receiving respective edges of the upper flange of arm 66, the flange thereby serving as a track 78 supporting jack 72 for reciprocation longitudinally of arm 66. Jack 72 may be raised or lowered by any conventional means such as by a fluid pressure apparatus (not shown) connected through control 80 mounted on tube 40, control 80 being coupled to jack 72 by corresponding lines 82.

Linkage means interconnects arms 66 and includes a pair of links 84 pivotally connected to corresponding arms and pivotally joined to a sleeve 86. An elongated screw member 88 is mounted on upper plate 26, extends through opening 89 in tube 40, and is threadably received by sleeve 86, there being a crank 90 for turning member 88 and thereby shifting sleeve 86 to swing tracks 78 toward and away from each other in a horizontal plane. Each slide 74 has a rod 92 connected thereto for reciprocating the corresponding jack 72, there being a clip 94 on the corresponding track 78 for releasably receiving rod 92.

In operation, support 14 is rolled beneath vehicle 16 until pad 64 engages bumper 20, whereupon crank 58 is turned until cables 56 are sufficiently unwound to permit the interlocking of hooks 62 beneath the lower edge of bumper 20. Crank 58 is then turned to tighten hooks 62 in their interlocked positions, the drum 52 being precluded from counter rotation by ratchet and pawl means 54. Tracks 78 are swung toward or away from each other as necessary by turning crank 90, and jacks 72 are shifted along corresponding tracks 78 by manipulation of rods 92 to thereby bring jacks 72 into alignment with the desired point of engagement with the undercarriage of vehicle 16. In the illustrated arrangement, jacks 72 are aligned with the A-arms 96 of the wheel assembly, whereupon control 80 is suitably actuated to raise jack 72 into firm engagement with A-arms 96. It will be recognized that jacks 72 may be designed to couple with other portions of the frame or wheel assembly of vehicle 16.

After hooks 62 and jacks 72 are coupled into supporting position, hoist 12 may be utilized to remove engine parts from compartment 22, it being appreciated that the dolly and hoist will not tip or swing by virtue of the firm stabilizing action provided by the dolly interconnections with vehicle 16. When it is desired to remove hoist 12 from its position alongside vehicle 16, it is only necessary to release ratchet and pawl means 54 to permit turning of drum 52 in a direction to release hooks 62 from bumper 20 and actuate control 80 to lower jacks 72, whereupon the dolly may be rolled from its position beneath vehicle 16. For storage purposes, hoist 12 may be removed from tube 40 and pin 44 removed to permit swinging of tube 40 into a horizontal position.

It will be noted that the dolly of the present invention may be adapted for use with virtually any type and size of vehicle inasmuch as structure is provided to vary the horizontal distance between jack units 72, as well as varying the distance between jack units 72 and mount 10. Also, jacks 72 and hooks 62 are readily coupled in their respective operating positions without any attendant need to move vehicle 16 to effect stabilization of hoist 12. The stress on dolly 16 caused by the lifting of engine parts by hoist 12 is borne in a proportionate manner by jacks 72 and hooks 62, whereby the tendency for the dolly to tip is greatly minimized.

Figure 4:
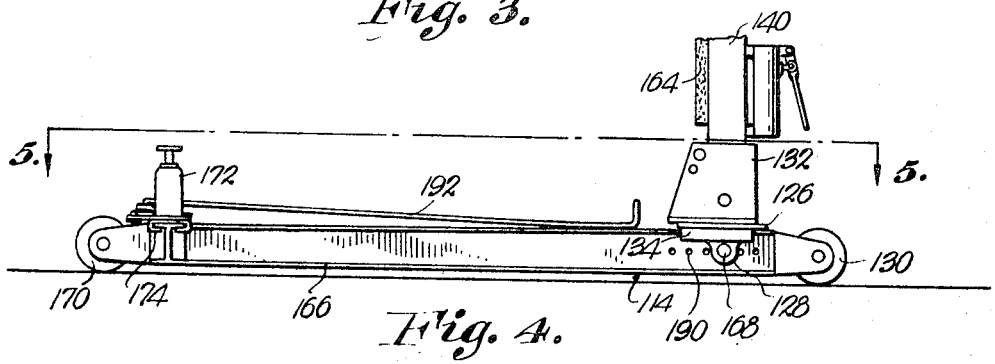
FIG. 4 is a fragmentary, side elevational view of a second embodiment of the invention.
Figure 5:
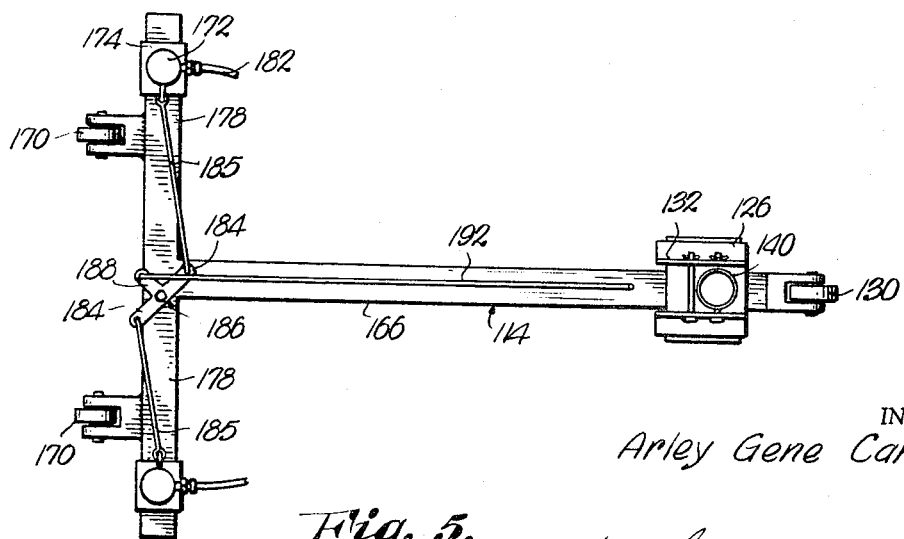
FIG. 5 is a cross sectional view taken along line 5—5 of FIG. 4.

A second embodiment of the invention is shown in FIGS. 4 and 5 and is similar to the above described embodiment in that a tube 140 is provided for supporting the hoist, the tube 140 being normally mounted in an upright position between panels 132 which are secured at their lowermost edges to a plate 126. The support 114 is T-shaped to present a central beam 166 and a pair of opposed tracks 178 formed by virtue of the transversely I-shaped configuration of support 114.

A pair of jacks 172 are mounted on corresponding slides 174 for longitudinal reciprocation along respective tracks 178. A pair of rollers 170 are secured to support 114 adjacent tracks 178 and a third roller 130 is secured to beam 166 adjacent plate 126. Linkage mechanism for varying the horizontal distance between jacks 172 is provided and includes a T-bracket 186 pivotally secured to support 114 and having a pair of arms 184 and a stem 188. Each jack 172 is pivotally connected to the proximal arm 184 by a rod 185, and a rod 192 is pivotally connected to stem 188 and extends along beam 166.

A slide 134 is secured to the underside of plate 126 and is reciprocably received by beam 166 for longitudinal shifting thereon. A pair of opposed collars 128 extend downwardly from slide 134 for alignment with one of the horizontally spaced apertures 190 provided in beam 166. A bolt 168 extends through collars 128 and the aligned aperture 190 to maintain tube 140 in the desired horizontal position with respect to jacks 172.

In operation, support 114 is rolled beneath a vehicle and jacks 172 shifted relative to each other by manipulation of rod 192 which swings bracket 186 for moving the jacks toward and away from each other on tracks 178. Jacks 172 are then raised into engagement with the vehicle therebeneath, such as by means of fluid pressure apparatus coupled through lines 182. Bolt 168 is then removed to permit shifting of plate 126 along beam 166 until pad 164 engages the bumper of the vehicle and whereupon bolt 168 is reinserted through collars 128 and the proximal aperture 190. The winch mechanism (not shown) mounted on tube 140 is then operated to interlock the hooks thereof with the bumper of the vehicle. The dolly is thereby suitably stabilized so that the hoist mounted thereon may be placed into use.

Having thus described the invention, what is claimed as new and desired to be secured by Letters Patent is:
1. A dolly for hoists comprising:
  a hoist mount;
  a support for said mount extending laterally therefrom and adapted for disposition beneath a vehicle with the mount extending upwardly from the support alongside the vehicle;
  structure on the support and shiftable upwardly into engagement with the vehicle therebeneath for stabilizing the dolly;
  said structure including at least a pair of horizontally spaced units, each shiftable upwardly into engagement with the vehicle therebeneath; and
  means for varying the horizontal distance between the units.
2. The invention of claim 1:
  each unit comprising a jack.
3. The invention of claim 1:
  said support including a pair of elongated tracks each supporting one of said units for reciprocation of longitudinally thereof; and
  means coupled with the units for reciprocating the same.
4. The invention of claim 3:
  said tracks being horizontally spaced; and
  means coupling the tracks with the mount for horizontal swinging movement of the tracks toward and away from each other.
5. The invention of claim 3:
  and means coupling the support with the mount for movement of the units toward and away from the mount.
6. A dolly for hoists comprising:
  a hoist mount;
  a support for said mount extending laterally therefrom and adapted for disposition beneath a vehicle with the mount extending upwardly from the support alongside the vehicle;
  mechanism for releasably attaching the mount to the vehicle; and
  structure on the support and engageable with the vehicle therebeneath for stabilizing the dolly.
7. The invention of claim 6:
  said structure being shiftable upwardly into engagement with the vehicle.
8. The invention of claim 6:
  said mechanism including a winch secured to the mount and having a cable thereon, and joinder means on the cable adapted to interlock with the vehicle.

References Cited

UNITED STATES PATENTS 3,154,206   10/1964   Gillette et al. _____ 254—2 X

ROY D. FRAZIER, *Primary Examiner.*

F. DOMOTOR, *Assistant Examiner.*

U.S. Cl. X.R.

248—13; 254—89